Oct. 11, 1960     G. A. HARADEN     2,955,711
LIQUID FILTER SYSTEM
Filed July 10, 1958
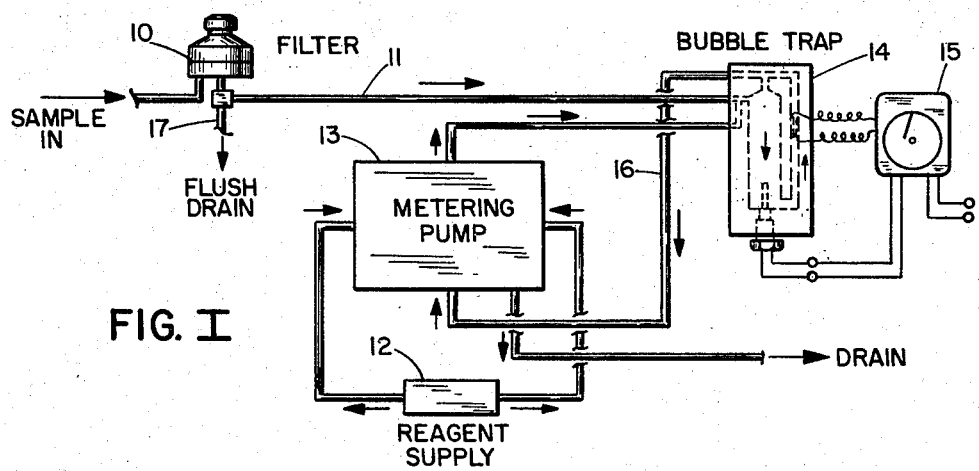
FIG. I
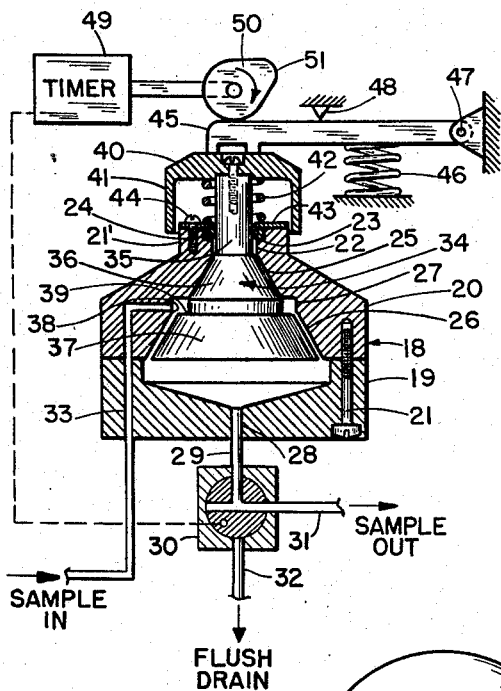
FIG. II
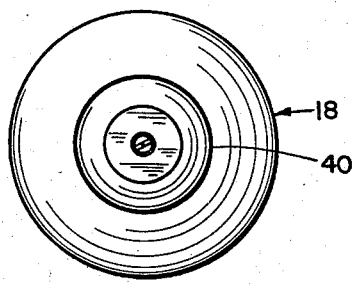
FIG. III
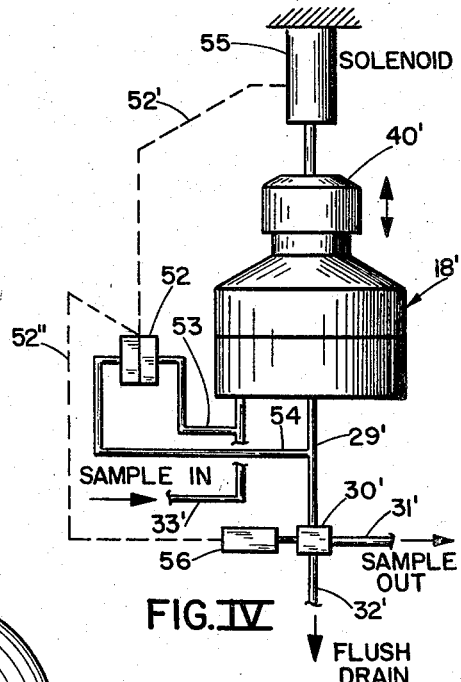
FIG. IV
INVENTOR
GEORGE A. HARADEN
BY
Lawrence H. Dalton
AGENT United States Patent Office 2,955,711
Patented Oct. 11, 1960

2,955,711

LIQUID FILTER SYSTEM

George A. Haraden, Needham, Mass., assignor to The Foxboro Company, Foxboro, Mass., a corporation of Massachusetts Filed July 10, 1958, Ser. No. 747,609

2 Claims. (Cl. 210—138)

This invention relates to means for trapping solids or semi-solids out of liquid flows and has particular reference to liquid filter means for use in continuous flow streams.

An example of a use of filter means according to this invention is in chlorination systems in water supply installations. In such systems chlorine concentration is measured and controlled by adding and measuring a reagent such as potassium iodide. The addition and measurement of the reagent requires that the flow stream be free of dirt and other particles, at least above a minimum size. It also requires that a filter device used for this purpose be positive in its filtering action and that it has a filter cleaning action which is positive and quick so as to avoid pasage of particles during or after flushing, and to provide a minimum of interruption of the flow stream. It is, further, desirable that the filter be resistant to corrosion in systems using corrosive fluids.

This invention is accomplished at least in part by means of a conical sleeve aperture arrangement preceded by a chamber for collecting filtered particles and constructed to provide both agitation and enlargement of the conical sleeve aperture to accomplish cleaning of the filter by flushing.

It is, therefore, an object of this invention to provide a new and improved liquid filter system.

Other objects and advantages of this invention will be in part apparent and in part pointed out hereinafter.

In the drawings:

Figure I is a schematic illustration of a chlorine concentration measurement system embodying filter means according to this invention;

Figure II is a view of a filter system according to this invention, mainly in vertical central section;

Figure III is a plan view of the main body of the system of Figure II, as if it were unsectioned; and Figure IV is a schematic illustration of another filter system according to this invention.

In the Figure I illustration of a system in which the filter means according to this invention may be used, a filter unit 10 is shown in the sample input line 11 of a system for measuring the chlorine concentration in water by a means of the addition thereto of a reagent and the measurement of the concentration thereof on an amperometric basis. This illustration of this measurement system is essentially self-explanatory in that the reagent from a supply 12 is metered in a pump 13 and then mixed with the incoming chlorinated water sample in the pipe 11 and applied to a bubble trap 14 for bubble-free amperometric measurement as indicated in the instrument 15. In this system the metering pump 13 is operated by the output of the bubble trap as through output pipe 16.

The Figure I filter unit 10 is shown with a flush-drain pipe 17. While the filter in this application is particularly concerned with low flows it may be applied to other applications by suitable dimensional arrangements as concerned with the combination of the flow rate and the size of the particle which is desired to be filtered out.

In Figure II the filter system comprises a housing unit 18 generally in the shape of an ordinary ink bottle with a cylindrical main body made up of a base 19 and the body unit 20 mounted thereon by means of screws such as 21.

The housing unit 18 is provided with a centrally disposed cylindrical neck portion 21' forming the top of the body unit 20. This housing has an over-all vertical opening centrally there through comprising a neck opening 22 with an O-ring step 23 therein. An O-ring 24 is mounted in the step 23. The remainder of the over-all opening comprises upper and lower conical openings 25 and 26 respectively, which are joined by a transverse annular opening 27 which is formed radially outward of the conical openings into the body unit 20. The over-all opening centrally through this over-all body tapers inwardly at the bottom to terminate in an exit passage 28 which is connected to an output pipe 29 and through a valving unit 30 to either a normal outlet 31 or a flush-drain outlet 32.

A sample inlet passage 33 is provided from the bottom of the unit up through the base 19, partly through the body unit 20, and then laterally into the annular opening 27.

Within the over-all opening defined by the neck opening 22 and the conical openings 25 and 26, a solid plunger member 34 is mounted for movement up and down within these openings. The solid member 34 is provided with a top cylindrical neck portion 35 located in the neck opening 22, bearing on the O-ring 24 in sealing relationship therewith and extending substantially above the main housing unit. The solid member 34 is further provided with a top conical portion 36 which fits into the top conical opening 25 in face to face sealing relationship therewith. The over-all solid body member 24 is further provided with a bottom conical portion 37 which lies within the conical opening 26 concentric and parallel therewith but of smaller size so as to provide a space between the wall of the opening 26 and the peripheral face of the bottom conical portion 37 of the solid member 34. The opening thus formed is indicated at 38 and is a conical sleeve formation. The opening 38 is thus annular in cross section and its width is determined on the basis of the size of particle which it is desired to filter out of the liquid stream through this device. The rate of flow of the liquid is also a consideration and these two factors together determine the dimensioning of all of the operation parts of the device.

The discussion of the solid inside member 34 hereinbefore mentioned is with respect to its filtering or normal condition. The solid member 34 has its conical formations in upright posture with the upper cone seated against the inside of the housing in conical face to conical face abutment. The lower cone thus provides a passage for liquid, with this passage too small for the particles to be filtered out to pass through. Such particles remain in the annular opening 27. This annular opening 27 is extended radially inward into the solid body member 34 as an inward extension of this opening 27 and forms an annulus which is triangular in cross-section with a base of the triangle horizontal and upwardly facing to provide a platform upon which the filtered particles come to rest.

In the Figure II showing, at the top of the figure, a cap 40 is provided, centrally mounted on the upper end of the solid member cylindrical portion 35, and with a downwardly extending peripheral lip 41 so dimensioned and arranged to move downwardly over the top cylindrical neck portion 21 of the housing 18. This cap 40 is spring pressed upwardly by a coil spring 42 acting against the underside of cap 40 and against a washer 43 mounted on the top of the neck portion 21 by connectors such as bolt 44. The washer 43 also serves to hold the O-ring 24 in place on the O-ring step 23. This spring action accomplishes a seating of the cone 36 in the opening 25, thereby assuring a uniform annular sleeve particle aperture between the conical body 37 and the conical opening 26. Therefore, this aperture width dimension is uniform throughout in the filtering condition of the device.

With this arrangement therefore, the cap 40 may be manually pressed down to move the solid inner body 34 downward in a flushing action for the filter. This downward movement opens up the gap between the lower solid body conical portion 37 and the wall of the conical opening 26 so that the particles heretofore trapped in the annular opening 27 may be flushed downward therethrough. Before this cap 40 is pressed downward in the flushing action, the valve 30 is operated to open the flush drain 32 and close off the sample outlet 31. This valving may be done manually (as in Figure I) or it may be done automatically as will be described hereinafter.

Automatic operation in the Figure II showing of the filter unit may be accomplished by means of a lever 45 which is normally spring pressed by a coil spring 46 upwardly about a pivot 47 against a stop 48. Through knowledge of the general process conditions of the flow stream through the filter unit and of the capacity of the filter unit itself, a timer device 49 may be set to operate a cam 50 at predetermined intervals so that the filter unit is automatically flushed periodically according to said time intervals. The rotation of the cam 50 engages the lever 45 with a cam riser 51 which forces the cap 40 and the solid conical body 34 downward in the flushing action.

The Figure III showing is a plan view of the filter unit of Figure II without the automatic cam, lever, and timer arrangement.

The Figure IV showing is an illustration of another form of automatic flushing action wherein the filter unit is indicated at 18', the neck cap at 40', the inlet pipe at 33', the outlet pipe at 29', the valving unit at 30', the sample outlet pipe at 31', and the flush drain pipe at 32'.

In this Figure IV system the automatic flushing is accomplished when a differential pressure indicates that the filter is becoming blocked-up by the filtered out particles. This is accomplished through a differential pressure device 52 with one pressure tap 53 in the liquid input stream line 33' and another pressure tap 54 in the outlet pipe 29'. Thus when a preselected differential pressure occurs in the unit 52, through its conventional differential arrangement a solenoid 55 is actuated to push the cap 40' downward to accomplish a flushing action of the filter unit. Further, through an operating connection 52" and suitable conventional devices (not shown) the differential pressure unit 52 may be made to operate a solenoid 56 which in turn operates the outlet valve 30' to open the flush drain and close the sample outlet 31' just prior to the flushing action wherein the cap 40' is pushed downward.

This device lends itself to effective use with corrosive fluids, and for this purpose suitable materials may be used in flow contacting portions of the device. For example, such materials as ceramics, plastics, glass or stainless steel may be used. The geometry of this device is simple and lends itself readily to the use of such materials.

This invention therefore provides a new and improved filter system.

As many embodiments may be made of the above invention and as changes may be made in embodiment set forth above without departing from the scope of the invention, it is to be understood that all matter hereinbefore set forth or shown in accompanying drawings is to be interpreted as illustrative only and not in a limiting sense.

I claim:

1. A liquid filter system comprising a housing, a filtered particle collection chamber in said housing, an entrance to said chamber, a size variable conical sleeve exit opening from said chamber, said conical sleeve opening being defined by a conical chamber in said housing and a concentric parallel conical body in said conical chamber, an exit passage from said conical sleeve opening, a drain passage from said exit passage, valving means for opening said drain passage and closing off said exit passage without closing off said drain passage, a cam and timing system for accomplishing said size variation by automatically moving said conical body a predetermined distance along its longitudinal axis at predetermined time intervals, and means for automatically operating said valving means just prior to said movement of said conical body.

2. A liquid filter system comprising a housing with a cylindrical body and a centrally disposed cylindrical neck on the top of said body, a vertical, central, over-all opening through said neck and said body comprising a top cylindrical neck opening with an O-ring step therein and an O-ring mounted on the step, a central, truncated, upright cone form opening with an annular opening vertically central of said cone opening and extending radially outward into said housing body, and a bottom opening in the form of an exit passage, an entrance from the bottom of said housing up through said cylindrical body and laterally into said annular opening, a solid body in said vertical overall opening, said solid body comprising a cylindrical top neck portion within said neck opening in sealing relation with said O-ring and extending a substantial distance thereabove and outside of said housing, a conical solid body portion lying in said conical opening with a top portion seated in face to face engagement in the top portion of said conical opening, a bottom portion lying in the bottom portion of said conical opening and spaced from the wall thereof to provide a conical sleeve opening traversely dimensioned to screen out particles in a liquid stream and exiting from said annular opening in said body, and an annular radially inward triangular step in said conical solid body portion as an enlargement of said annular opening in said housing and providing an upwardly facing horizontal step face for collecting filtered particles, a cap secured on said outside neck of said solid body, spring-pressed upwardly to maintain said arrangement of said solid body in said housing with said cap movable downward against said spring to enlarge said conical sleeve opening in the course of a flushing action to remove filtered particles from said annular opening.

References Cited in the file of this patent

UNITED STATES PATENTS

| | | |
|---|---|---|
| Re. 15,678 | MacArthur | Aug. 21, 1923 |
| 493,937 | Moore | Mar. 21, 1893 |
| 2,499,494 | Greer | Mar. 7, 1950 |